(12) United States Patent
Urosu

(10) Patent No.: US 7,577,985 B1
(45) Date of Patent: Aug. 18, 2009

(54) TRUSTED HANDLER AND DATA ASSOCIATION

(75) Inventor: Dan Urosu, Los Angeles, CA (US)

(73) Assignee: Symantec Corporation, Mountain View, CA (US)

( * ) Notice: Subject to any disclaimer, the term of this patent is extended or adjusted under 35 U.S.C. 154(b) by 760 days.

(21) Appl. No.: 11/049,607

(22) Filed: Feb. 1, 2005

(51) Int. Cl.
  G06F 17/00 (2006.01)
  G06F 7/04 (2006.01)
  G06F 17/30 (2006.01)
  G06F 15/16 (2006.01)
  H04L 9/00 (2006.01)
  H04L 9/32 (2006.01)

(52) U.S. Cl. .................... 726/2; 726/1; 726/3

(58) Field of Classification Search .............. 726/1, 726/2, 3
See application file for complete search history.

(56) References Cited

U.S. PATENT DOCUMENTS 5,566,326 A * 10/1996 Hirsch et al. ............... 703/26
6,947,556 B1 * 9/2005 Matyas et al. .............. 380/29

OTHER PUBLICATIONS

Access Control List Administration White Paper Jul. 2002 © Copyright 2002. LSI Logic Corporation. All Rights Reserved.*
The Design and Implementation of the 4.4BSD Operating System Pub Date: Apr. 30, 1996 Excerpt: Section 4.5. Process Creation.*
Microsoft® Computer Dictionary, Fifth Edition Pub Date: May 1, 2002 Definition: hash.*
Computer Dictionary Online Definition: hash coding (Aug. 3, 1997) http://www.computer-dictionary-online.org/hash%20coding.htm?q=hash%20coding.*
Pop-Up Stopper Professional [Online] Apr. 22, 2005, [Retrieved from the Internet on Apr. 22, 2005] Retrieved from the Internet: <URL: http://www.panicware.com/index.html>, Seattle, WA.
AdsCleaner v 4.3 for Windows NT/2000/XP, [Online] Apr. 22, 2005 [Retrieved from the Internet on Apr. 22, 2005] Retrieved from the Internet: <URL: http://www.adscleaner.com>.
AntiTracer: Unwanted Pop-ups and other Advertisements, [Online] Apr. 22, 2005, [Retrieved from the Internet on Apr. 22, 2005] Retrieved from the Internet: <URL: http://www.antitracer.com/popup_killer.html>, Dublin, IE.
"Gold Parser, A Free Multi-Platform Parser Generator", [online] devincook.com [retrieved Oct. 7, 2003] Retrieved from the Internet: <URL: http://www.devincook.com/goldparser/index.htm>.
"RFC 2821—Simple Mail Transport Protocol", Klensin J., editor, Apr. 2001, [online] Faqs.org [retrieved Oct. 13, 2003] Retrieved from the Internet: <URL: http://www.faqs.org/rfcs/rfc2821.html>.

(Continued)

Primary Examiner—Kambiz Zand
Assistant Examiner—Benjamin A Kaplan
(74) Attorney, Agent, or Firm—Fenwick & West LLP

(57) ABSTRACT

A trusted handler manager (100) designates (210) at least one file to protect and associates (220) at least one trusted handler (320) with each protected file (310). As file handlers attempt file access, the trusted handler manager (100) permits regulated access (250) to protected files (310) by associated trusted handlers (320), and permits limited access (260) to protected files (310) by processes other than associated trusted handlers (320).

29 Claims, 4 Drawing Sheets

OTHER PUBLICATIONS

Sabin, Todd, "Comparing binaries with graph isomorphisms", downloaded from http://www.bindview.com/Services/Razor/Papers/2004/comparing_binaries.cfm, Jan. 17, 2006, Cupertino, CA.

Flake, Halvar, "Automated Reverse Engineering" Black Hat Windows 2004, downloaded from http://www.blackhat.com/html/bh-media-archives/bh-archives-2004.html, Jan. 17, 2006, Seattle, WA.

* cited by examiner

7,577,985 B1

TRUSTED HANDLER AND DATA ASSOCIATION

TECHNICAL FIELD

The present invention relates generally to computer file security, and more particularly to the association of files with trusted processes.

BACKGROUND ART

Most computer files can be accessed in some fashion by several software applications. Word processing data files, for example, can typically be accessed by applications such as Microsoft Word, Word Perfect, Star Office, Lotus Notes, or the like regardless of what application was used to create the file. Even processes with specialized functionality such as presentation or spreadsheet applications can possess a limited ability to read and interact with data files originally created with other processes. The introduction of network computing and network communications valued such process versatility as a significant advantage. Given the vast number of diverse platforms running a multitude of different processes, the capability to interact with several different types of files was one of the early challenges to network computing. Surmounting this challenge with was a significant achievement for the software industry. However, data files are no longer the exclusive realm of legitimate and trustworthy software. The advent of network computing has also accelerated the spread of malicious computer code. For the purposes of the present application, malicious computer code includes computer code commonly referred to as computer viruses, worms, Trojan horses, Spam, spy-ware, adware, and any other type of unauthorized or unsolicited computer code that appears in a computer without an authorized user's knowledge and/or without an authorized user's consent.

Adware, spy-ware, Trojan horses, and worms are processes that typically interact with data files beyond the view of the owner of the files. While the more notorious malicious codes can alter or even delete data files, other forms of spy-ware and adware copy can extract information from the data files, leaving little or no trace of their presence. Data files are indifferent to the source of a compatible application that accesses the file. Data files also do not typically question the veracity or legitimacy of an accessing software application. Data management programs and digital rights management programs do exist that establish access privileges for specific data files. But, while such programs attempt to manage unauthorized access to a file, they require direct user interaction, and typically limit a user's access to a file and not a process' access to a file. Such password protection schemes are tedious and typically require users to identify the document as being in need of protection, and mandate that the users input access authorization each time they wish to view or interact with the data. While for some files such a scheme may suffice, it is unreasonable to demand such frequent user interaction for files that are routinely accessed.

There remains a clear need for an effective way to protect computer files from malicious computer code without necessitating a user to input a password or similar authentication to interact with the file. What are needed are methods, systems, and computer readable media to isolate files from malicious computer code while providing seamless and transparent access to authentic and legitimate software applications.

DISCLOSURE OF INVENTION

Methods, systems, and computer-readable media control access to computer files. A trusted handler manager (100) designates (210) at least one file to protect and associates (220) at least one trusted handler (320) with each protected file (310). As file handlers attempt file access, the trusted handler manager (100) permits regulated access (250) to protected files (310) by associated trusted handlers (320), and permits limited access (260) to protected files (310) by processes other than associated trusted handlers (320).

The features and advantages described in this disclosure and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

BRIEF DESCRIPTION OF THE DRAWINGS

These and other more detailed and specific objects and features of the present invention are more fully disclosed in the following specification, reference being had to the accompany drawings, in which.

The Figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION OF THE PREFERRED EMBODIMENTS

Figure 1:
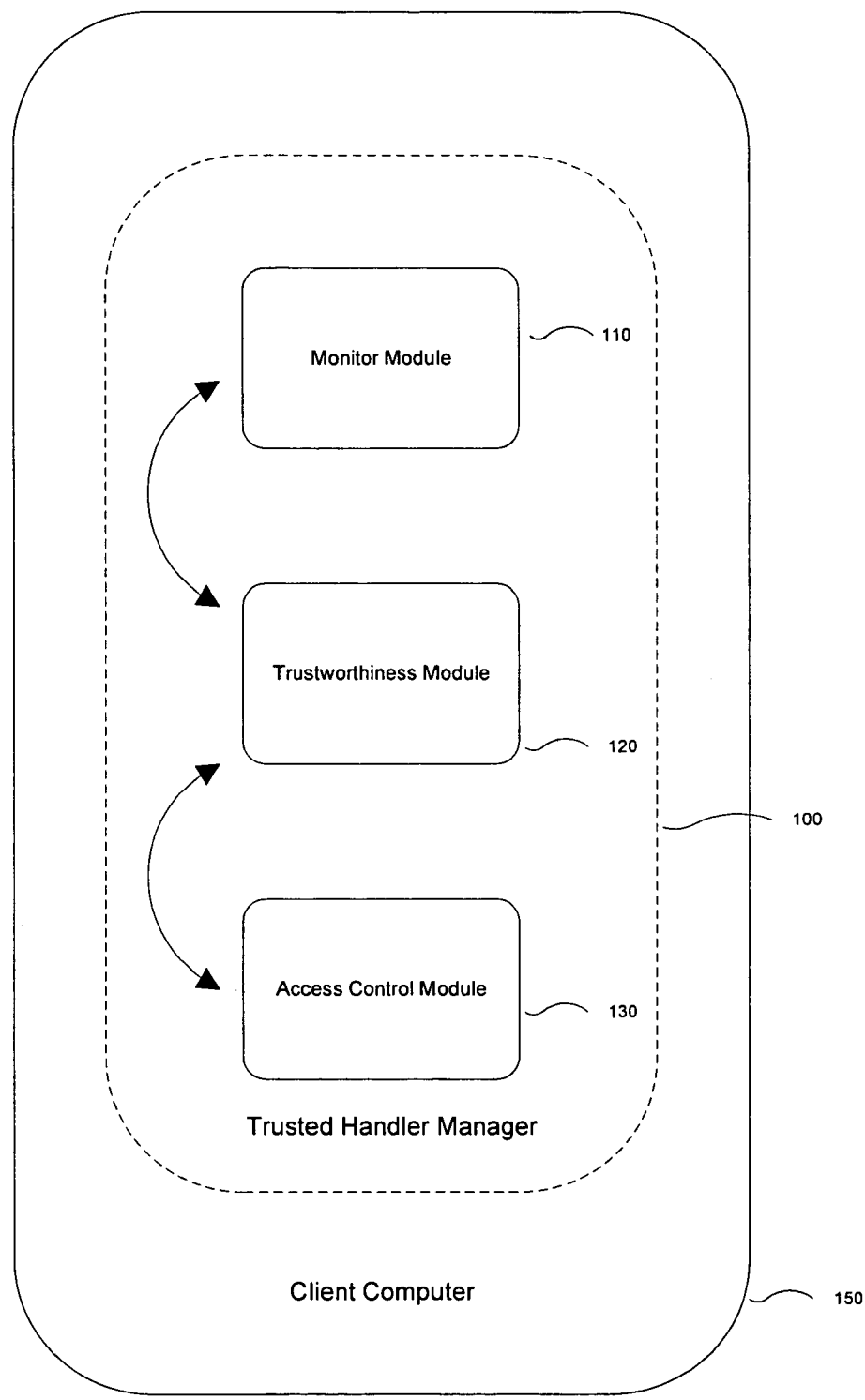
FIG. 1 is a high level block diagram showing an apparatus for controlling access to computer files according to some embodiments of the present invention.

FIG. 1 illustrates a high level block diagram of a trusted handler manager 100 for practicing some embodiments of the present invention. The trusted handler manager 100 associates at least one trusted handler 320 with each computer file 310 designated for protection, and regulates access 250 to the protected computer files 310 by associated trusted handlers 320. The trusted handler manager 100 further limits access 260 to the protected computer files 310 by processes other than associated trusted handlers 320.

It is to be understood that although the trusted handler manager 100 is illustrated as a single entity, as the term is used herein a trusted handler manager 100 refers to a collection of functionalities which can be implemented as software, hardware, firmware, or any combination of these. Where a trusted handler manager 100 is implemented as software, it can be implemented as a standalone program, but can also be implemented in other ways, for example as part of a larger program, as a plurality of separate programs, as one or more device drivers, or as one or more statically or dynamically linked libraries. When the trusted handler manager 100 is implemented as software, the software can reside on any type of computer readable medium or media such as a floppy disk, DVD, CD, Optical disk, or the like.

The trusted handler manager 100, as depicted in FIG. 1, comprises a monitor module 110, a trustworthiness module 120, and an access control module 130. As computer files are designated for protection by a user, the trustworthiness system 120 associates at least one trusted handler 320 with each protected file 310. When attempts to access the protected files 310 occur by trusted handlers 320 associated with the files 310, the trusted handler manager 100 regulates access 250 to the files 310. Furthermore, the trusted handler manager limits access 260 to the protected files 310 by processes other than associated trusted handlers 320. File handlers and processes, such as word processing, data processing, and presentation applications, comprise executable computer code that access and manipulate data. Examples of such handlers include Microsoft Word, Word Perfect, Microsoft Excel, Lotus 123, Microsoft PowerPoint, and the like. File handlers and processes also comprise open source software and freeware and, in some situations, malicious computer code. Trusted handlers 320 comprise file handlers that are verified for their authenticity.

As will be apparent to one of ordinary skill in the relevant art, handlers provided by legitimate software vendors are typically provided with some form of authentication. This authentication provides the recipient of the file handler confidence that the product is reliable and does not possess, or is associated with, malicious computer code. Many vendors sign the software with a digital signature certifying the software's authenticity, providing the recipient with confidence that the process they are implementing is identical to the process that the vendor sold. In addition, check sums, hash values, or other content verification techniques that are well known to one of ordinary skill in the art can verify that a process has not been altered. These and other techniques for verifying the authenticity of a process can be successfully utilized by the trusted handler manager 100. The implementation methodologies for such techniques in the context of the present invention will be apparent to one of ordinary skill in the relevant art.

In one embodiment of the present invention, the trusted handler manager 100 examines and assigns a trustworthiness level to each process based on the degree upon which the process can be reliably authenticated. For example, a Microsoft process possessing a digital signature and a verifiable check sum can be assigned a higher trustworthiness level than an open source process downloaded over the Internet. While both may be legitimate and valuable, processes possessing a verifiable authenticity are awarded a higher level of trustworthiness. The level of trustworthiness can be used to determine the degree of access a process is granted by the file handler manager 100.

Figure 2:
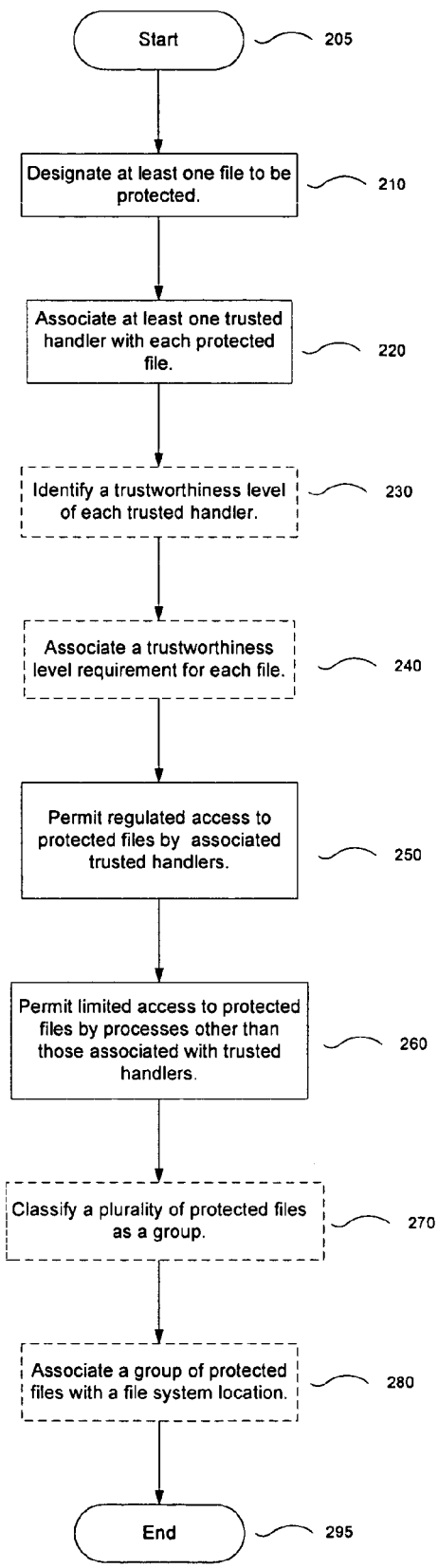
FIG. 2 is a flow diagram showing a method for controlling access to computer files according to some embodiments of the present invention.
Figure 3:
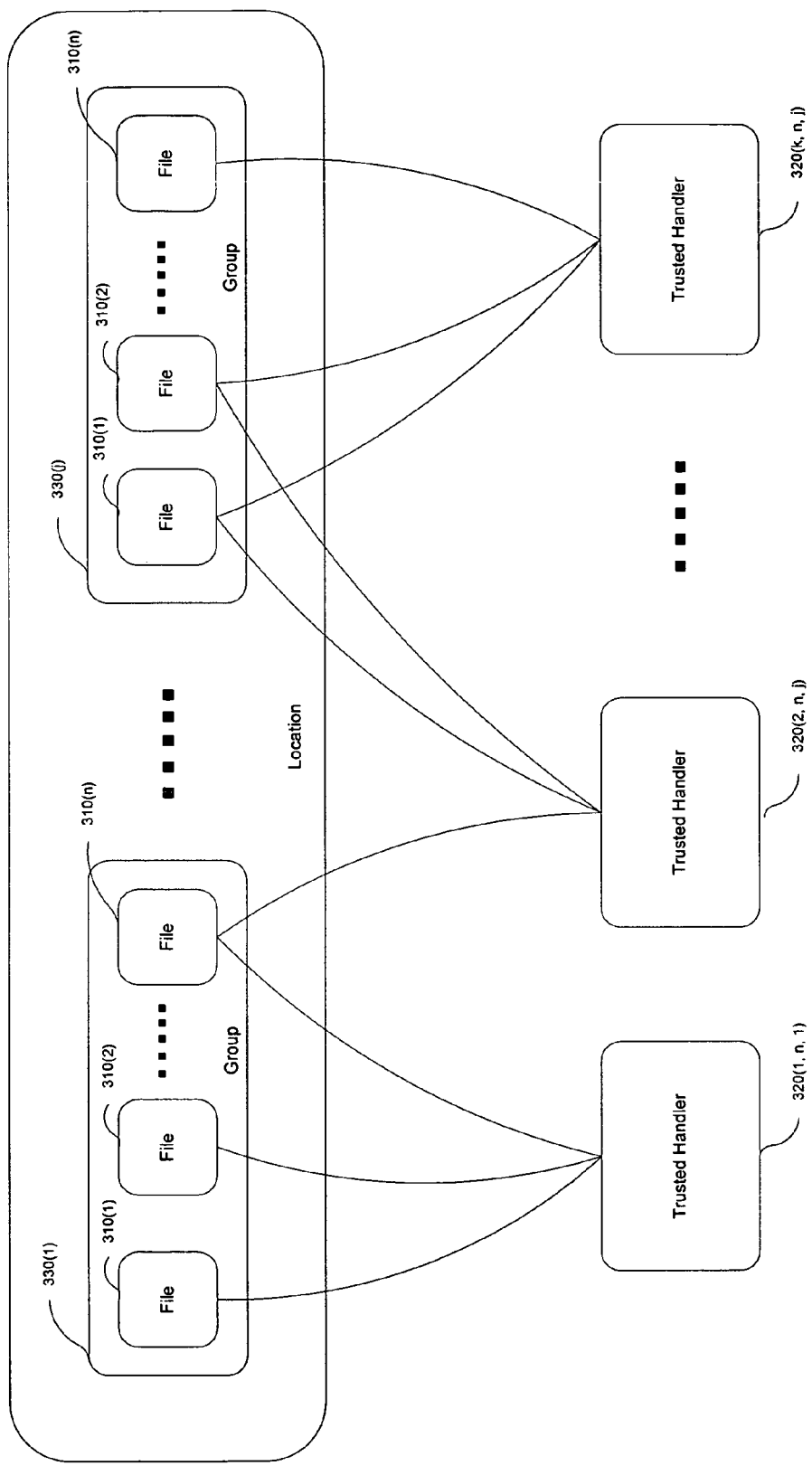
FIG. 3 is a flow diagram of a trusted handler manager's response to an attempt to access a protected computer file, according to some embodiments of the present invention.

FIG. 2 shows a flow diagram of a method for controlling access to computer files according to some embodiments of the present invention. Based on inputs from the user, the trusted handler 100 designates 210 at least one file 310 to be protected, and associates 220 the protected file 310 with at least one trusted handler 320. In one embodiment of the present invention and as illustrated in FIG. 3, the trusted handler manager 100 classifies a plurality of protected files 310 as a group 330. This group of files 330 can be further associated with a file system location 350 such as a folder, drive, or the like and, in one embodiment of the present invention, can be organized according to the protected files' association with similar trusted handlers 320. As shown in FIG. 3, each protected file 310 in a first group of files 330(1) is associated 220 with the same trusted handler 320(1,n,1), and each protected file 310 in a second group of files 330(j) is associated 220 with a different trusted handler 320(k,n,j). These groups of files 330 reside in a single file location 350. Furthermore, protected files 310 in each group 330 can also be associated 220 with additional trusted handlers 320 without influencing their protected status or grouping.

The designated location 350 can be further identified with a specific folder name such as the Windows' "my documents" folder or a named 'user's documents' folder. For example in one embodiment, the trusted handler manager 100 may place all protected files 310 that are associated with the trusted handler Microsoft Word in the 'my protected Word documents' folder while placing all protected files 310 associated with Lotus Notes in a folder entitled 'my protected Lotus documents'. The trusted handler manager 100 can group these two folders of protected files 310 into a single location 350 called, for example, 'my protected documents'. From a hierarchical point of view, the trusted handler manager 100 regulates access to the 'my protected documents' folder to any trusted handler 320, but limits access to the Lotus or Word folder to their respective trusted handlers 320, Lotus Notes and Microsoft Word.

Once a user designates 210 a file 310 to be protected, and associates 220 the file with at least one trusted handler 320, no further action by the user, or interaction with the trusted handler manager 100 by the user, is necessary. Opening and accessing the file 310 using the designated trusted handler 320 is seamless. A user would only become aware of the protected nature of the file 310 if access of the file were attempted by a non-trusted handler.

In one embodiment of the present invention and as shown in FIG. 2, the trustworthiness system 120 identifies 230 a trustworthiness level of each trusted handler 320 and/or associates 240 a trustworthiness level with each protected file 310. In addition to associating 230 at least one trusted handler 320 to each protected file 310, a general trustworthiness level associated with the file and/or the file's location allows, if permitted by the user, file handlers 320 with a minimum level of trustworthiness to access the protected files 310. For example, a protected file 310 that is associated with the trusted handler Microsoft Word can also be designated by the user, and associated by the trusted handler manager 100, with a trustworthiness level requiring that any trusted handler seeking access the files possess verification of authenticity in the form of a digital signature. As the trusted handler manager 100 limits access 260 to processes other than the associated trusted handler Microsoft Word, the trusted handler manager 100 can be configured to allow limited access to a compatible process whose authenticity is verified through the possession of a digital signature. Thus, an attempt to access the protected file 310 by a digitally signed version of Word Perfect would be allowed.

Figure 4:
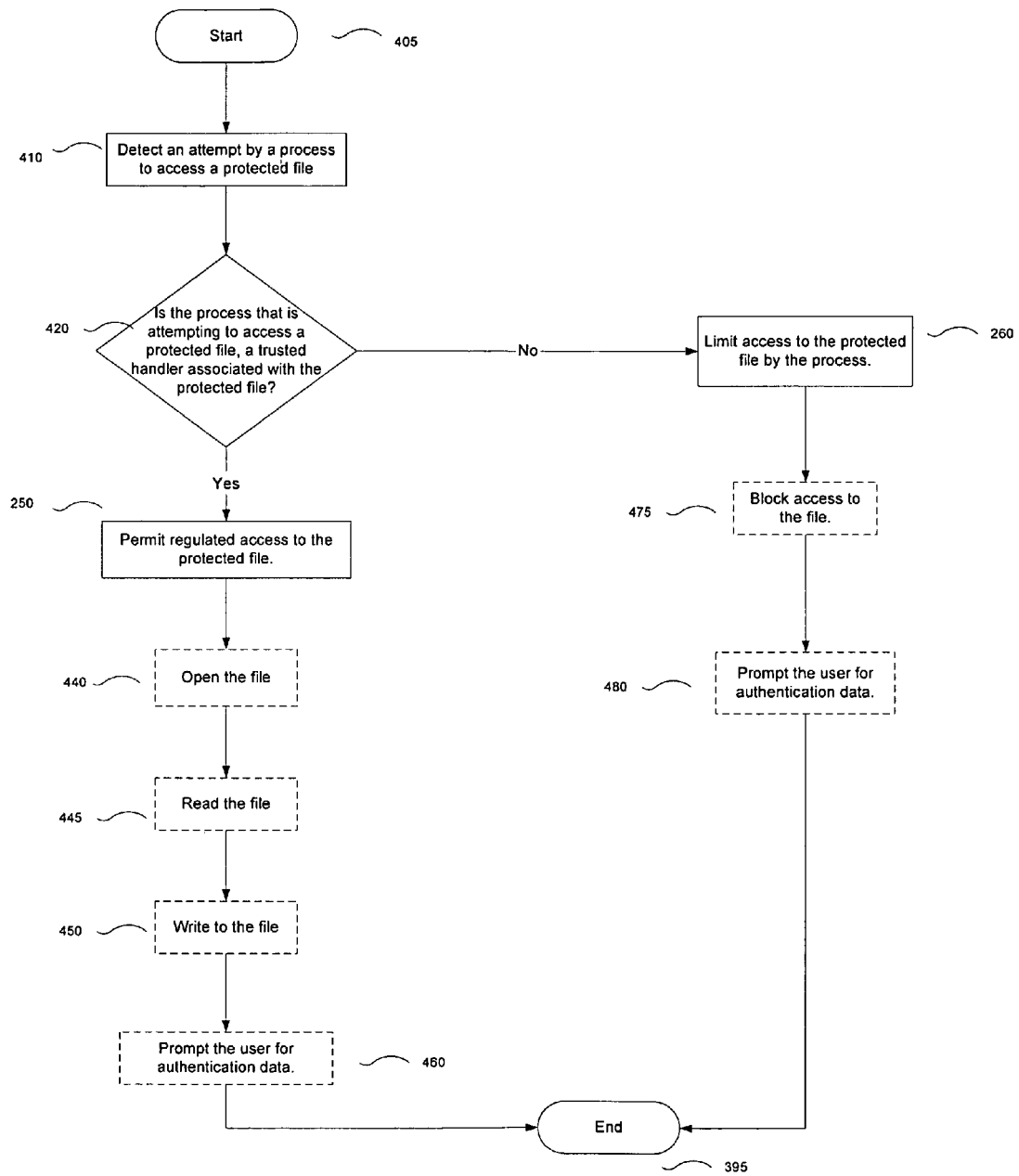
FIG. 4 is a flow diagram of a trusted handler manager's response to an attempt to access a protected computer file, according to some embodiments of the present invention.

FIG. 4 is a flow diagram of a trusted handler manager's response to an attempt to access a protected computer file, according to some embodiments of the present invention. Attempts to access a protected file are detected 410 by the monitor system 110 of the trusted handler manager 100. Once an attempt to access a protected file 310 has been detected, the file handler manager's access control module 130 determines 420 whether the process attempting to access the protected file 310 is a trusted handler 320 associated with that protected file 310. When the file handler manager 100 determines that the process attempting to access the file is a trusted handler 320 associated with that protected file 310, the trusted handler manager 100 permits 430 regulated access 250 to the file. In one embodiment of the present invention, regulated access comprises opening the file 440, reading the file 445, and/or writing to the file 450. In another embodiment of the present invention, regulated access 250 to the protected files 310 includes prompting 460 the user for authentication data to permit additional options. Upon receiving proper authentication data, these options include renaming the file, deleting the file, or the like. In that embodiment, the access control module 130 of the trusted handler manager 100 restricts these and other actions that may modify the protected file 310 to users possessing proper authentication.

When the trusted file manager 100 determines 420 that the process attempting to access the protected file 310 in not a trusted handler 320 associated with the protected file 310, access to the file is limited 260. In one embodiment of the present invention, these limitations comprise blocking 475 the process' access to the protected file 310 and/or prompting the user for authentication data 480. In the later scenario of that embodiment, the trusted file manager 100, upon receiving proper authentication data from the user, permits the process to access the protected file 310. Once access has been gained, the process possesses the ability to interact with the protected file 310 as if it were a trusted handler 320. For example, when a process such as Word Perfect attempts to access a protected file whose associated trusted handler is Microsoft Word, the trusted handler manager 100 limits Word Perfect's access to the protected file 310. The user receives a prompt indicating that Word Prefect is attempting to access a protected file 310 that is associated only with Microsoft Word. Upon gaining proper user authentication data, the trusted file manager 100 grants Word Perfect access the protected file 310, and permits WordPerfect to interact with the protected file 310 as if it were an associated trusted handler 320.

In one embodiment of the present invention, when the monitor system 110 detects 410 an attempt to access a protected file by a process, the access control module 130 determines 420 whether the process attempting access is a trusted handler 320 associated with the protected file 310. When the trusted handler manager 100 determines that the process attempting access is a trusted handler 320 associated with the file 310, the trusted file manager 100 regulates that process' access, including permitting that trusted handler 320 to move and/or copy the protected file within its associated file system location. In that embodiment, and upon prompting and receiving proper user authentication data, the trusted file manager 100 further permits the trusted handler 320 to move and/or copy the protected file 310 outside its associated file system location.

As will be understood by those familiar with the art, the invention may be embodied in other specific forms without departing from the spirit or essential characteristics thereof. Likewise, the particular naming and division of the modules, managers, systems, functions, layers, features, attributes, methodologies and other aspects are not mandatory or significant, and the mechanisms that implement the invention or its features may have different names, divisions and/or formats. Furthermore, as will be apparent to one of ordinary skill in the relevant art, the modules, managers, systems, functions, layers, features, attributes, methodologies and other aspects of the invention can be implemented as software, hardware, firmware or any combination of the three. Of course, wherever a component of the present invention is implemented as software, the component can be implemented as a script, as a standalone program, as part of a larger program, as a plurality of separate scripts and/or programs, as a statically or dynamically linked library, as a kernel loadable module, as a device driver, and/or in every and any other way known now or in the future to those of skill in the art of computer programming. Additionally, the present invention is in no way limited to implementation in any specific programming language, or for any specific operating system or environment. Accordingly, the disclosure of the present invention is intended to be illustrative, but not limiting, of the scope of the invention, which is set forth in the following claims.

What is claimed is:

1. A computer-implemented method for controlling access to computer files, the computer-implemented method comprising:
   designating at least one file as being protected;
   associating at least one trusted handler stored on a computer with each protected file, the at least one trusted handler comprising executable code;
   permitting regulated access to a protected file by an associated trusted handler executed by a user; and
   preventing processes executed by the user, other than associated trusted handlers, from accessing the protected file.

2. The computer-implemented method of claim 1 further comprising classifying a plurality of protected files as a group.

3. The computer-implemented method of claim 2 further comprising associating the group with a file system location.

4. The computer-implemented method of claim 2 further comprising:
   detecting an attempt by a process to access a protected file in the group;
   determining whether the process comprises a trusted handler associated with the protected file; and
   responsive to the process comprising a trusted handler associated with the protected file, permitting the trusted handler regulated access to the protected file.

5. The computer-implemented method of claim 4 wherein permitting the trusted handler regulated access to the protected file comprises:
   permitting the trusted handler to perform at least one action from the group of actions consisting of:
   moving the file within a file system location associated with the group; and
   copying the file within the file system location associated with the group.

6. The computer-implemented method of claim 4 wherein permitting the trusted handler regulated access to the protected file comprises:
   prompting a user for authentication data; and
   responsive to receiving authentication data from the user, permitting the trusted handler to perform at least one action from the group of actions consisting of:
   moving the file to a location outside of a file system location associated with the group; and
   copying the file to a location outside of the file system location associated with the group.

7. The computer-implemented method of claim 4 wherein determining whether the process comprises a trusted handler associated with the protected file comprises checking the process for an identifying digital signature.

8. The computer-implemented method of claim 4 wherein determining whether the process comprises a trusted handler associated with the protected file further comprises computing a hash value of the process.

9. The computer-implemented method of claim 1 wherein permitting regulated access comprises:
   permitting the trusted handler to perform at least one action from the group of actions consisting of:
   opening the file;
   reading the file; and
   writing to the file.

10. The computer-implemented method of claim 1 wherein permitting regulated access comprises:
    prompting the user for authentication data; and
    responsive to receiving authentication data from the user, permitting the trusted handler to perform at least one action from the group of actions consisting of:
    renaming the file; and
    deleting the file.

11. The computer-implemented method of claim 1 wherein preventing processes executed by the user comprises:
    prompting the user for authentication data; and
    responsive to receiving authentication data from the user, permitting a process other than an associated trusted handler access to the file.

12. The computer-implemented method of claim 1 wherein preventing processes executed by the user comprises:
    blocking the processes from accessing the file.

13. The computer-implemented method of claim 1 wherein access to the protected file by the associated trusted handler is regulated based on a level of trustworthiness determined for the trusted handler.

14. The computer-implemented method of claim 13 wherein the level of trustworthiness determined for the trusted handler is determined based at least in part on whether the trusted handler includes an identifying digital signature.

15. At least one computer-readable storage medium containing a computer program product for controlling access to computer files, the computer program product comprising:
    program code configured to designate at least one file as being protected;
    program code configured to associate at least one trusted handler stored on a computer with each protected file, the at least one trusted handler comprising executable code;
    program code configured to permit regulated access to a protected file by an associated trusted handler executed by a user; and
    program code configured to prevent processes executed by the user, other than associated trusted handlers, from accessing the protected file.

16. The computer program product of claim 15 further comprising program code configured to classify a plurality of protected files as a group.

17. The computer program product of claim 16 further comprising program code configured to associate the group with a file system location.

18. The computer program product of claim 16 further comprising:
    program code configured to detect an attempt by a process to access a protected file in the group;
    program code configured to determine whether the process comprises a trusted handler associated with the protected file; and
    program code configured to permit the trusted handler regulated access to the protected file responsive to the process comprising a trusted handler associated with the protected file.

19. The computer program product of claim 18 wherein the program code configured to permit the trusted handler regulated access to the protected file comprises:
    program code configured to permit the trusted handler to perform at least one action from the group of actions consisting of:
    moving the file within a file system location associated with the group; and
    copying the file within the file system location associated with the group.

20. The computer program product of claim 18 wherein the program code configured to permit the trusted handler regulated access to the protected file comprises:
    program code configured to prompt a user for authentication data; and
    responsive to receiving authentication data from the user, program code configured to permit the trusted handler to perform at least one action from the group of actions consisting of:
    moving the file to a location outside of a file system location associated with the group; and
    copying the file to a location outside of the file system location associated with the group.

21. The computer program product of claim 18 wherein the program code configured to determine whether the process comprises a trusted handler associated with the protected file comprises program code configured to check the process for an identifying digital signature.

22. The computer program product of claim 18 wherein the program code configured to determine whether the process comprises a trusted handler associated with the protected file further comprises program code configured to compute a hash value of the process.

23. The computer program product of claim 15 wherein the program code configured to permit regulated access comprises:
    program code configured to permit the trusted handler to perform at least one action from the group of actions consisting of:
    opening the file;
    reading the file; and
    writing to the file.

24. The computer program product of claim 15 wherein the program code configured to permit regulated access comprises:
    program code configured to prompt the user for authentication data
    responsive to receiving authentication data from the user, program code configured to permit the trusted handler to perform at least one action from the group of actions consisting of:
    renaming the file;
    and deleting the file.

25. The computer program product of claim 15 wherein the program code configured to prevent processes executed by the user comprises:
    program code configured to prompt the user for authentication data; and
    program code configured to permit a process other than an associated trusted handler to access the file responsive to receiving authentication data from the user.

26. The computer program product of claim 15 wherein the program code configured to prevent processes executed by the user comprises:

program code configured to block the processes from accessing the file.

27. The computer program product of claim 15 wherein access to the protected file by the associated trusted handler is regulated based on a level of trustworthiness determined for the trusted handler.

28. The computer program product of claim 27 wherein the level of trustworthiness determined for the trusted handler is determined based at least in part on whether the trusted handler includes an identifying digital signature.

29. An apparatus having a computer-readable storage medium having computer program instructions embodied therein for controlling access to computer files, the computer program instructions comprising:

a trustworthiness module configured to designate at least one file as being protected, and configured to associate at least one trusted handler stored on a computer with each protected file, the at least one trusted handler comprising executable code;

a monitor module configured to detect an attempt by a process executed by a user to access a protected file; and coupled among the trustworthiness module and the monitor module, an access control module configured to determine whether the process attempting to access the protected file is a trusted handler associated with the protected file, configured to permit regulated access to the protected file by the process if the process is an associated trusted handler, and configured to prevent the process from accessing the protected file if the process is not an associated trusted handler.

* * * * *